C. L. HALL.

Assignor of part interest to S. W. & G. W. PARSONS.

Coffee and Peanut-Roaster.

No. 8,479. Reissued Nov. 5, 1878.

Attest:
A. Barthel
N. S. Sprague

Inventor:
C. L. Hall
By Atty
Thos. S. Sprague

UNITED STATES PATENT OFFICE.

CASSIUS L. HALL, OF YPSILANTI, MICHIGAN, ASSIGNOR OF PART INTEREST TO SAMUEL W. PARSONS AND GEORGE W. PARSONS.

IMPROVEMENT IN COFFEE AND PEANUT ROASTERS.

Specification forming part of Letters Patent No. 196,964, dated November 6, 1877; Reissue No. 8,479, dated November 5, 1878; application filed August 17, 1878.

*To all whom it may concern:*

Be it known that I, CASSIUS L. HALL, of Ypsilanti, in the county of Washtenaw, State of Michigan, have invented an Improvement in Coffee and Peanut Roasters, of which the following is a specification:

The nature of my invention consists in the construction and arrangement of a coffee and peanut roaster, with a furnace so constructed that the flues of the furnace surround and form an oven, within which the roasting-cylinder is operated, so that the contents of the roasting-cylinder are at no time brought into contact with the heated surface of the oven, in which case they would be heated and frequently burned by contact therewith, but, on the contrary, are roasted by the action of the heated air radiated through the inner shell of the oven.

The invention consists in the combination, with the cylindrical oven, of the peculiarly-situated furnace, and heating and exit flues; in the peculiar roasting device for receiving a removable perforated roasting-cylinder; and, further, in various combinations of the several operative parts, as hereinafter pointed out.

Figure 1:
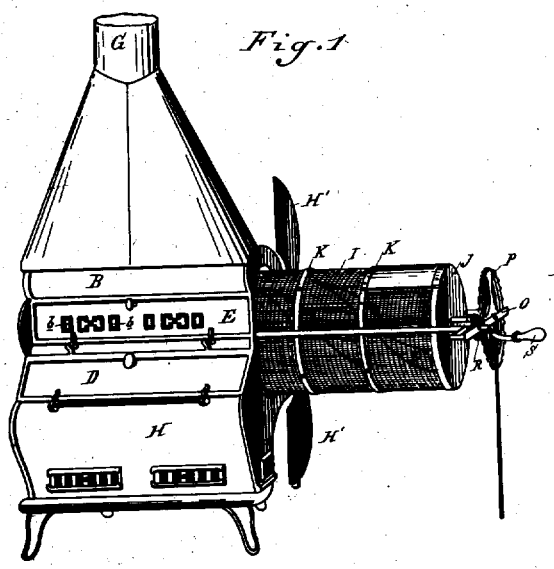
Figure 2:
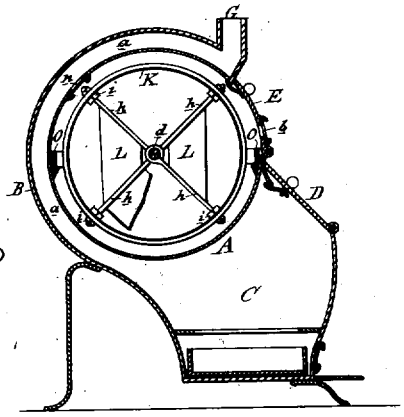
Figure 3:
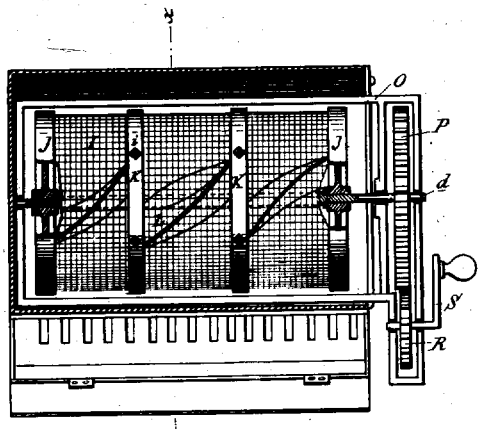
Figure 4:
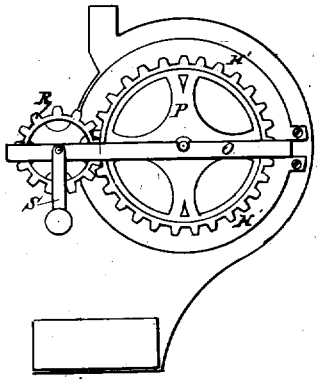

Figure 1 is a perspective view of my improved roaster ready for use. Fig. 2 is a transverse vertical section on the line *x x* in Fig. 3. Fig. 3 is a partial longitudinal section. Fig. 4 is an end elevation of the operating end.

In the accompanying drawings, which form a part of this specification, A represents a cylindrically-shaped shell, made of any suitable material, which forms the inner wall of an oven which is heated by the products of combustion in the combustion-chamber C, having a suitable grate and ash-pan, as shown, and an inclined door, D, at the front and near the top, through which the fuel is inserted, and further heated by the passage of such products of combustion through the circular flue *a*, formed between the shell A and the outer shell, B, to the exit G. The furnace H, supported upon suitable legs, is situated underneath the oven, and in front of its axial center, so that a portion of the inner shell is heated directly from the combustion-chamber, and as the gases and smoke pass through the circular flue *a* they heat the balance of the inner shell before they pass to the exit, which is located near the front and at the top of the oven.

The furnace H, the flue *a*, and the exit G extend the entire length of the outer shell or case, B, and the heat and smoke act upon the entire inner shell, A, except the portion situated at the front between the chimney or exit G and the top of the furnace. At this point is a door, E, opening to the interior of the inner shell, A, and in this door are suitable dampers *b*, to admit the outer air into said cylinder or shell A when desired. One end of this oven is entirely inclosed, while the other and opposite end is provided with two half-doors, H′ H′, so pivoted that one will open upward and the other downward to disclose an opening into the oven, through which the roasting-cylinder is inserted and withdrawn, as occasion may require. This roasting-cylinder is made of wire-cloth I, attached to heads J, and through the center of these heads is passed a shaft, *d*, to which the heads are secured at suitable intervals on the shaft; and within the roasting-cylinder are placed the spiders, the radial arms *h* of which are of equal length, and their outer ends pass through the cylinder and through metal bands K, which surround the cylinder, and nuts *i i* on the ends of said arms, one outside and one inside the cylinder, allow of adjusting the same to a true circle at all points at equal distance from the shaft.

To the arms or stays *h* are secured, in inclined position, the curved or twisted wings L, which stir and turn over the coffee in the cylinder as the same is being rotated. These wings are so arranged as to connect one stay of one series with the second one of the next series—that is, they are curved somewhat in spiral form, and thereby carry the article being roasted from end to end of the cylinder and back.

The cylinder-shaft *d* rests on a frame, O, which is movable out and in upon longitudinal ribs *m*, secured on the inside of the inner shell, A.

The parts are so constructed that when the frame O is inserted in the shell the cylinder can rotate freely therein without coming in contact with the same.

The frame O, within which the roasting-cylinder is journaled, and by means of which it is inserted and held in position within the oven, is of sufficient length to extend outside the oven, and within said extended part the cog-wheel P is secured upon the shaft *d*. This wheel engages with a pinion, R, secured upon the crank-shaft S, and by these means the roasting-cylinder is rotated.

In the back of the inner shell, A, are dampers *n*, to allow an excess of heated air within the oven to escape into the flue *a*, and to regulate the heat within the same in conjunction with the front dampers *b*.

The peculiar advantages of this device are as follows:

First, the cylindrical shape of the oven and the method of heating the same, as described, produce a very uniform heat within the oven without any waste of space. Wood or coke may be used in the furnace. It may be used out doors or indoors if the exit-flue is connected with a chimney. It may be used in the sales-room, and makes a good heating-stove.

Second, it embodies the principle of roasting by hot air by radiation, instead of induction or contact with hot surfaces, so that the coffee is not blackened or charred by such contact. Roasting may be quickly done, without danger of burning, with a hot fire, with much less shrinkage.

Third, it runs easily, being so geared that a natural motion to the crank will give the proper velocity to the cylinder.

Fourth, if the cylinder is kept in motion, it is impossible to burn its contents by a hot fire. The spiral wings inside the cylinder are so arranged as to carry the coffee from end to end thereof, back and forth, so that it will roast perfectly even, although the fire may be hotter at one end of the combustion-chamber than the other.

In addition to these advantages, the coffee being roasted may be inspected without removing the roasting-cylinder from the oven, and the construction of the furnace makes it very convenient to supply it with fuel.

I am aware that a coffee-roaster has been patented having a perforated roasting-cylinder mounted in a sliding frame and adapted to be removed from a cylindrical oven, which oven has a circular flue around both sides, and a flue at one end connecting with a small exit on top of the outer shell, a furnace being situated in the outer shell directly below the oven; but this roaster does not heat the roasting-cylinder equably on account of the position of the furnace, the flue at one end of the oven, and the small exit; it has no means for regulating the heat in the oven or provision for inspecting the coffee without removing the roasting-cylinder from the oven; has no means for agitating the coffee or moderating the speed of revolution of the cylinder; cannot be fed with fuel as easily as my device, and, generally, is less efficient and less convenient than my roaster.

I am also aware that a drier has been patented with the furnace situated below and the exit-flue above the drying-chamber, and both in front of a vertical line through the axis of the chamber; but in this drier there is a dead-air space between the furnace and the oven; the heating-flue does not envelop the sides of the oven, but is only wide enough to cover a portion of the center of the same, leaving two-thirds ($\frac{2}{3}$) or more of the cylindrical shell of the oven exposed, and not covered or heated by the flue, all of which prevent the equable heating of the oven; and the furnace cannot be conveniently fed with fuel; and, in addition, this drier is not provided with other parts and contrivances which are necessary to adapt it for efficient and convenient use as a coffee and peanut roaster.

What I claim as my invention is—

1. A coffee-roaster having, in combination, a cylindrical oven in which the roasting-cylinder is revolved, a furnace situated below and partially in front of said oven, and having its combustion-chamber extended upwardly on the front side of the oven, and a circular flue extending from such combustion-chamber around the rear side and over the top of the oven, and terminating in an exit-flue at the front of said oven, substantially as described and shown.

2. The combination, with the cylindrical oven in which the roasting-cylinder is placed, a furnace below and partially in front of such oven, and extending the entire length of the same, a circular flue around the rear side and over the top of the oven, and an exit-flue on top of the oven and of the same length as such oven, substantially as described and shown.

3. A furnace and oven adapted to receive a removable perforated coffee-roasting cylinder, consisting of an inner cylindrical shell of the same length as the outer shell, and having an open end to receive the roasting-cylinder, an outer shell extending almost entirely around the inner shell, and rigidly secured thereto, and forming a space nearly around the sides of the inner shell, but not at the ends of the same, a furnace within such outer shell below and partially in front of the inner shell, an exit projecting from the upper front edge of the outer shell, and a door in the inner shell between the exit-flue and the furnace, constructed and arranged substantially as described and shown.

4. In a coffee-roaster, the combination, with a cylindrical oven, of a roasting-cylinder mounted in a frame adapted to slide in and out of such oven, and a crank, S, and gearing P R supported in the end of such sliding frame, substantially as described and shown.

5. A roasting-cylinder consisting of wire-cloth secured to suitable cylinder-heads mounted upon a driving-shaft, and provided with radial arms or stays and adjusting-nuts, substantially as and for the purposes herein set forth.

6. The front dampers, *b*, and rear dampers, *n*, in combination with the inner and outer shells, A B, substantially as and for the purposes specified.

7. The combination of the inner shell, A, provided with interior ribs *m*, the outer shell, B, having combustion-chamber C and exit G, with the flue *a*, partially surrounding the inner shell, and the movable frame O, with the roasting-cylinder, all substantially as and for the purposes herein set forth.

8. The combination of the inner and outer shells, A and B, the former being provided with interior ribs *m* and dampers *b n*, and the latter having combustion-chamber C, with the furnace H and exit G, both arranged at the front of the machine, with the flue *a* surrounding the inner shell, and the roasting-cylinder supported upon the movable frame O, all constructed and arranged to operate substantially as and for the purposes set forth.

9. In combination with a roasting-cylinder, made of wire-cloth secured to suitable heads, and with the surrounding bands K, the devices, substantially as herein described, for securing the proper longitudinal tension of the wires and the uniform radial tension from the shaft, substantially as set forth.

10. The spirally-curved wings secured to and in combination with the radial arms, provided with adjusting-nuts, the shaft *d*, and roasting-cylinder, substantially as and for the purposes described.

CASSIUS L. HALL.

Witnesses:
R. D. COY,
F. A. HUNT.